(12) United States Patent
Jennings et al.

(10) Patent No.: US 11,698,967 B2
(45) Date of Patent: *Jul. 11, 2023

(54) SYSTEM FOR AUTOMATED MALICIOUS SOFTWARE DETECTION

(71) Applicant: SOOS LLC, Winooski, VT (US)

(72) Inventors: Joshua Holden Jennings, South Royalton, VT (US); Timothy Paul Kenney, Richmond, VT (US)

(73) Assignee: SOOS LLC, Winooski, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,002

(22) Filed: Aug. 12, 2022

(65) Prior Publication Data

US 2023/0019837 A1 Jan. 19, 2023

Related U.S. Application Data

(63) Continuation of application No. 17/460,611, filed on Aug. 30, 2021, now Pat. No. 11,436,330.

(60) Provisional application No. 63/203,255, filed on Jul. 14, 2021.

(51) Int. Cl.
| | |
|---|---|
| *G06F 7/04* | (2006.01) |
| *G06F 21/56* | (2013.01) |
| *G06F 40/20* | (2020.01) |
| *G06N 20/00* | (2019.01) |

(52) U.S. Cl.
CPC ............ *G06F 21/566* (2013.01); *G06F 40/20* (2020.01); *G06N 20/00* (2019.01)

(58) Field of Classification Search
CPC ........ G06F 21/566; G06F 40/20; G06N 20/00
See application file for complete search history.

(56) References Cited

U.S. PATENT DOCUMENTS

| | | | |
|---|---|---|---|
| 2003/0004716 A1* | 1/2003 | Haigh .................... | G10L 15/10 704/238 |
| 2005/0021994 A1* | 1/2005 | Barton .................. | G06F 21/562 726/26 |
| 2015/0172303 A1* | 6/2015 | Humble .............. | H04L 63/1408 726/23 |

* cited by examiner

*Primary Examiner* — Hang Pan
(74) *Attorney, Agent, or Firm* — Caldwell Intellectual Property Law

(57) ABSTRACT

A system for automated malicious software detection includes a computing device, the computing device configured to receive a software component, identify at least an element of software component metadata corresponding to the software component, determine a malicious quantifier as a function of the software component metadata, wherein determining the malicious quantifier further comprises obtaining a source repository, the source repository including at least an element of source metadata, and determining the malicious quantifier as a function of the at least an element of software component metadata and the at least an element of source repository metadata using a malicious machine-learning model, and transmit a notification as a function of the malicious quantifier and a predictive threshold.

20 Claims, 8 Drawing Sheets

SYSTEM FOR AUTOMATED MALICIOUS SOFTWARE DETECTION

CROSS-REFERENCE TO RELATED APPLICATIONS

This application is a continuation of Non-provisional application Ser. No. 17/460,611 filed on Aug. 30, 2021, and entitled "SYSTEM FOR AUTOMATED MALICIOUS SOFTWARE DETECTION," which claims the benefit of priority of U.S. Provisional Patent Application Ser. No. 63/203,255, filed on Jul. 14, 2021, and titled "OPEN SOURCE PACKAGE AND LIBRARY LOOK-ALIKE DETECTION AND NOTIFICATIONING," both of which are incorporated by reference herein in their entirety.

FIELD OF THE INVENTION

The present invention generally relates to the field of cybersecurity. In particular, the present invention is directed to a system and method for automated malicious software detection.

BACKGROUND

Currently, open-source software repositories are easily hacked which places a plurality of look-alike software into the repository. This is further complicated by the large amount of software that relies on open-source software repositories. Moreover, malicious actors have taken advantage of this by creating look-alike packages and libraries with names that are very similar to the names of authentic packages and libraries but with common typing mistakes or missing characters.

SUMMARY OF THE DISCLOSURE

In an aspect, a system for automated malicious software detection includes a computing device, the computing device configured to receive a software component, wherein the software component comprises at least an element of software metadata, wherein the element of software metadata comprises a component name. The computing device further configured to obtain a source repository, wherein the source repository comprises at least an element of source metadata. The computing device further configured to identify a string distance between the at least an element of software metadata and the at least an element of source metadata. The computing device further configured to generate a malicious machine-learning model as a function of a malicious training set, wherein the malicious training set correlates a metadata difference to a malicious identifier. The computing device further configured to determine a malicious quantifier as a function of the malicious machine-learning model and the string distance.

In another aspect, a method for automated malicious software detection includes receiving, by a computing device, a software component, wherein the software component comprises at least an element of software metadata, wherein the element of software metadata comprises a component name. The method further includes obtaining, by the computing device a source repository, wherein the source repository comprises at least an element of source metadata. The method further includes, identifying, by the computing device, a string distance between the at least an element of software metadata and the at least an element of source metadata. The method further includes, generating, by the computing device, a malicious machine-learning model as a function of a malicious training set, wherein the training set correlates a metadata difference to a malicious identifier. The method further includes determining, by the computing device, a malicious quantifier as a function of the malicious machine-learning model and the string distance.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated malicious software detection. In an embodiment, this disclosure may assemble information and/or metadata, from software components and/or software repositories to determine a likelihood that a specified software component or collection of components, such as a package or library, located in a software repository is malicious and not intended software due to a typographical error, typo squatting, cybersquatting, hijacking technique, and the like thereof. Aspects of the present disclosure can be used to receive a software component. Aspects of the present disclosure can also be used to identify an element of software component metadata. Aspects of the present disclosure can also be used to determine a malicious quantifier as a function of the software component metadata, such that the malicious quantifier denotes a likelihood that a malicious software and/or component exists in the software component. This is so, at least in part, because this disclosure includes a machine-learning model. Aspects of the present disclosure allow for transmitting an notification as a function of the malicious quantifier and a predictive threshold. Exemplary embodiments illustrating aspects of the present disclosure are described below in the context of several specific examples.

Figure 1:
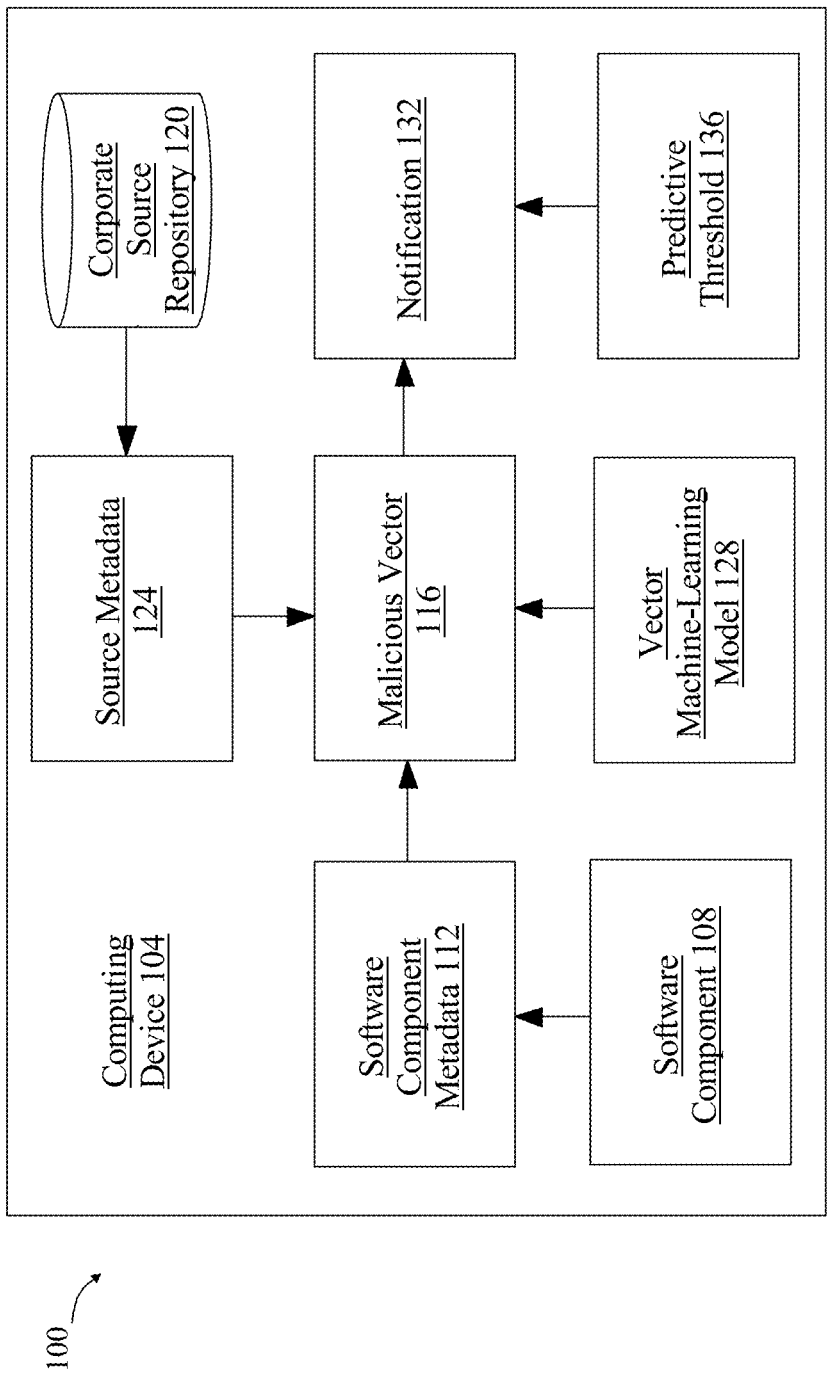
FIG. 1 is a block diagram of a system for automated malicious software detection according to an embodiment of the invention

Referring now to FIG. 1, an exemplary embodiment of a system 100 for automated malicious software detection is illustrated. System includes a computing device 104. computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 receives a software component 108. As used in this disclosure a "software component" is a library and/or collection of files that make up an application and/or program. For example, and without limitation, software component 108 may include a library comprising a single file containing one or more objects. In an embodiment, and without limitation, software component 108 may be linked in programs (dynamic link) and/or the binary relocatable code incorporated into the calling program binary (static link). Dynamically linked libraries may be loaded into memory when first called and may be used by many programs. Dynamic libraries persist in memory as long as there is a link to them from an active program. Binary libraries may be prepared by a compiler from source code and the components packaged by a library archiver, part of the software development suite. Libraries for scripting languages may be simply a file containing a collection of function or object declarations in source code but may also contain compiled binary language extensions. In an embodiment, and without limitation, software component 108 may include a software package comprising a collection of files that make up an application or capability, which may include binary executables, libraries, source text files, documentation files, scripts, and the like thereof, however a library may sometimes be referred to as a package in certain language directives. In another embodiment, and without limitation, software component may include packages that may be built or installed by a system package manager or loaded into memory by a directive statement in a programming language. In another embodiment, and without limitation, software component may include one or more system packages that may become part of the operating system resources and may be used by any script or program.

Still referring to FIG. 1, computing device 104 identifies at least an element of software component metadata 112 corresponding to software component 108. As used in this disclosure "software component metadata" is data that is identifies one or more unique and/or distinct elements of software component 108. In an embodiment, and without limitation, software component metadata 112 may include a component name. As used in this disclosure a "component name" is the unique identifier, name, and/or label of the software component. For example, component name may include a name as typed (NAT), such as but not limited to a software label, library name, and the like thereof. In an embodiment, and without limitation, component name may include a naming standard. For example, a naming standard may include a prepend comprising a string of characters, symbols, letters, special characters, and the like thereof and/or an append comprising a string of characters, symbols, letters, special characters. For example, and without limitation, component name may prepend "ABC_" to all names of software component metadata 112. As a further non-limiting example, component name may include a unique identifier comprising an append "ftp-transport" to all names of software component metadata 112. Additionally or alternatively, software component metadata 112 may include a metadata element such as but not limited to structural metadata, guide metadata, technical metadata, process metadata, business metadata, descriptive metadata, administrative metadata, preservation metadata, rights management metadata, accessibility metadata, and the like thereof.

In an embodiment, and still referring to FIG. 1, software component metadata 112 may include one or more download counts, wherein download counts are the actual number of downloads for a package or library or a bucketization of download counts (the numbers broken into discrete bins). As a further non-limiting example, software component metadata 112 may include one or more contributor counts, wherein a contributor count is the actual number of contributors for a package or library or a bucketization of contributor counts (the numbers broken into discrete bins). As a further non-limiting example, software component metadata 112 may include one or more release counts, wherein a release count is the actual number of releases for a package or library or a bucketization of release counts (the numbers broken into discrete bins). As a further non-limiting example, software component metadata 112 may include a bucketization of the time, wherein a bucketization of the time is the time between the first and last release of the numbers broken into discrete bins. As a further non-limiting example, software component metadata 112 may include a release per period, wherein a release per period is the time between releases over a period of time or a bucketization of the release per period (the numbers broken into discrete bins). As a further non-limiting example, software component metadata 112 may include NLINES, wherein NLINES are the number of lines added, changed and/or deleted per a period of time or a bucketization of the number of lines per a period (the numbers broken into discrete bins). As a further non-limiting example, software component metadata 112 may include a commit history, wherein a commit history is the number of commits per a period of time or a bucketization of the number of commits per a period of time (the number broken into discrete bins). As a further non-limiting example, software component metadata 112 may include a package description, wherein a package description is descriptive data denoting an author, the location of the repository, version histories, and the like thereof. As will be appreciated by persons having ordinary skill in the art, the foregoing list is provided by way of example and other metadata can be added as an extension or fine tuning of the algorithms disclosed herein. As a further non-limiting example, software component metadata 112 may also comprise a code complexity and history, wherein a code complexity and history are an automated measure of code complexity changes with a new version might indicate a malicious package or library. As a further non-limiting example, software component metadata 112 may comprise a number of other packages or libraries to be included and history, wherein a number of other packages or libraries to be included and history is the total number of files the package or library contains. As a further non-limiting example, software component metadata 112 may comprise a number of other packages and libraries included, wherein a number of other packages and libraries included is the number of other packages and libraries the specified package or library utilizes, wherein a higher number may be an indicator of legitimacy. As a further non-limiting example, software component metadata 112 may include a repository commit detail, wherein a repository commit detail is a message and/or code that may indicate legitimacy. As a further non-limiting example, software component metadata 112 may include a repository issue text, wherein a repository issue text is text about possible issues with a package and/or library. As a further non-limiting example, software component metadata 112 may include one or more repository subscriber counts, stars and/or likes. As a further non-limiting example, software component metadata 112 may include a repository URL and/or history, wherein a repository URL and/or history is a package and/or library with the same name. As a further non-limiting example, software component metadata 112 may include a repository user and/or contributor detail and/or history, wherein a repository user and/or contributor detail and/or history is a tracked activity of the user and/or account details.

Still referring to FIG. 1, computing device 104 determines a malicious quantifier 116 as a function of software component 108. As used in this disclosure a "malicious quantifier" is a measurable value denoting the likelihood of the presence of malicious software and/or malicious components. In an embodiment, and without limitation, software and/or components may include software and/or components such as but not limited to ransomware, file less malware, spyware, adware, trojans, worms, rootkits, keyloggers, bots, mobile malware, and the like thereof. In an embodiment, and without limitation, malicious quantifier may include a malicious vector. As used in this disclosure a "malicious vector" is a vector denoting a likelihood of the presence of malicious software, wherein a "vector" as defined in this disclosure is a data structure that represents one or more quantitative values and/or measures the likelihood of the presence of malicious software. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes.

In an embodiment, and still referring to FIG. 1, computing device 104 may determine malicious quantifier 116 as a function of identifying a malicious component embedded in software component 108. As used in this disclosure a "malicious component" is a library and/or package that comprises a malicious act and/or malicious intent. For example, malicious component may include one or more libraries and/or packages that are placed by typo squatters that have similar names to authentic software. In an embodiment, typo squatters may rely on several techniques to take advantage of common typing errors. The following examples illustrate common typo squatter techniques for a hypothetical package name, "sckit-learn 1.03", replacing special characters "sckit_learn 1.03", removing special characters "scikitlearn 1.03", typing mistake "scikt-learn 1.03" string order "learn-sckit 1.03", character order "scikit-laern 1.03", looking for spelling mistakes "scikit-lern 1.03", creating a new version that is not legitimate "scikit-learn 1.031", hoping for an autocorrect or autocomplete replacement: "sciencekit-learn 1.03", and the like thereof. In another embodiment, malicious component may include a package or library which may include intentional vulnerabilities, backdoors, remote code execution, hidden code, viruses, malware, spyware, data harvesting, intentional error generation, or other malicious actions. In an embodiment, and without limitation, malicious component may be hard to detect after inclusion because they may perform the functions of the originally intended package or library exactly as expected, with the addition of a hidden malicious action that is undetectable until activated. Additionally or alternatively, malicious component may be any component, build, package, library, and the like thereof that is intending to misrepresent, cybersquat, hijack software component 108. In an embodiment, and without limitation, system 100 may be designed and configured to scan a listing of software component names such as a list of packages and/or library names, for example in a software manifest (such as a package.json/package-lock.json file for NPM, gemfile/gemfile.lock for Ruby or any of the other manifest formats which contain a list of packages and versions), or a software bill of materials (SBOM), and detect naming errors before the malicious package is accessed as described below in detail. For example, computing device 104 may detect naming errors before the malicious package is accessed as a function of producing a natural language processing module. Language processing model may include a program automatically generated by computing device 104 to produce associations between one or more significant terms extracted from software component and/or source repository and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given solvency signature does not contain and/or indicate a grouping semantic relationship. Whether a phrase, sentence, word, or other textual element in solvency signature constitutes a positive or negative indicator may be determined, in an embodiment, by mathematical associations between detected significant terms, comparisons to phrases and/or words indicating positive and/or negative indicators that are stored in memory at computing device, or the like.

Still referring to FIG. 1, computing device 104 may identify malicious component by any suitable method, including without limitation a natural language processing classification algorithm; language processing model may include a natural language process classification model, for instance as generated by training neural network, that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between semantic elements such as terms, phrases, tokens, etc. There may be a finite number of categories to which an extracted word may pertain; an HMM inference algorithm, such as the forward-backward algorithm or the Viterbi algorithm, may be used to estimate the most likely discrete state given a word or sequence of words. Computing device 104 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

In an embodiment, and still referring to FIG. 1, computing device 104 may train language processing module using multi-task learning. As used herein, multi-task learning (MTL) is a subfield of machine learning in which multiple learning tasks are solved at the same time, while exploiting commonalities and differences across tasks. This may result in improved learning efficiency and prediction accuracy for the task-specific models, when compared to training models separately.

Still referring to FIG. 1, computing device 104 determines malicious quantifier as a function of obtaining a source repository 120. As used in this disclosure a "source repository" is a database, file, collection, and/or databank comprising all of the packages and/or libraries. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In another embodiment, and without limitation, source repository 120 may include a repository of known libraries, and packages and accompanying metadata that may be maintained and continuously updated with any changes from all available corporate and/or open-source repositories for new packages, new versions, and changes to metadata. The repository may be maintained by continually polling all known repositories for new and updated libraries, packages, versions and metadata using any of a variety of polling techniques known in the art such as subscribing to an API endpoint or feed which lists new or updated packages, versions or metadata, or crawling through all available data and comparing to all known packages, versions or metadata. Additionally or alternatively, source repository 120 may include a repository of all known installable packages, libraries, or other components and metadata about the package or library, wherein this may include all open-source packages and libraries. As a non-limiting example, source repository 120 may be maintained by constantly scanning many sources of information for open-source information and updating with any changes or additions. In an embodiment, and without limitation, source repository may include one or more open-source distribution indexes and/or services such as, but not limited to, Maven Java, NPM registry, Python Package Index, RubyGems Repository, .NET repository NuGet, PHP, Dart Flutter, Rust, Erlang/Elixir, Homebrew, National Vulnerability Database (NVD), GitHub Security Advisories, NPM Security Advisories, OSS License Data, SPDX OSS License Database, GitHub, GitLab, BitBucket, and the like thereof.

Still referring to FIG. 1, source repository 120 is configured to include at least an element of source metadata 124. As used in this disclosure "source metadata" is data that is identifies one or more unique and/or distinct elements of software, applications, source code, and the like thereof from source repository 120. Source metadata 124 may include any element of metadata similar to software component metadata 112. For example, and without limitation, source metadata 124 may include a NAT, structural metadata, guide metadata, technical metadata, process metadata, business metadata, descriptive metadata, administrative metadata, preservation metadata, release counts, bucketization of the time, release per period, NLINES, commit history, package description, code complexity and history, number of other packages or libraries to be included and history, packages and libraries included, repository commit detail, a repository issue text, repository subscriber counts, stars and/or likes, repository URL and/or history, repository user and/or contributor detail and/or history, and the like thereof. In an embodiment, and without limitation, source metadata 124 may include the name and/or metadata about the packages and/or libraries. In an embodiment, and without limitation, source metadata 124 may include one or more naming conventions associated to the packages and/or builds. As used in this disclosure a "naming convention" is a strategy and/or protocol to be adhered to for naming packages and/or libraries. This may take the form of regular expression with substitution characters of literals and metacharacters providing support for complex matching. For example, and without limitation, company ABC may have a standard that limits name matches in the corporate library to the company prepend string and an append string of a last updated date. For example, and without limitation, corporate name may include one or more input strings such as "abc_", "ABC_", and/or any text that closes with a format of YYYY-MM-DD.

Still referring to FIG. 1, computing device 104 determines malicious quantifier 116 as a function of software component metadata and source repository metadata using a malicious machine-learning model 128. As used in this disclosure an "malicious machine-learning model" is a machine-learning model to determine malicious quantifier 116 output given software component metadata and/or source repository metadata as inputs, wherein a machine-learning model incorporates a machine-learning process, and wherein "machine-learning process," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Malicious machine-learning model 128 may include one or more malicious machine-learning processes such as supervised, unsupervised, or reinforcement machine-learning processes that computing device 104 and/or a remote device may or may not use in the determination of malicious quantifier 116. As used in this disclosure "remote device" is an external device to computing device 104. Malicious machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support malicious machines, kernel support malicious machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train malicious machine-learning process as a function of a malicious training set. As used in this disclosure a "malicious training set" is a training set that correlates a metadata difference to a malicious identifier. As used in this disclosure a "metadata difference" is measurable value representing a difference and/or discrepancy associated with software component metadata and/or source repository metadata. For example, and without limitation, metadata difference may be 20 for a difference exists as a function of a component name comprising "ABC_" and a source repository metadata naming convention of "abc_." As used in this disclosure a "malicious identifier" is a measurable value representing the presence malicious schemas. In an embodiment, and without limitation, malicious identifier may denote the presence of cybersquatting, hijacking, typo squatting, and the like thereof. The malicious training set may be received as a function of user-entered valuations of metadata differences and/or malicious identifiers. Computing device 104 may receive malicious training set by receiving correlations of metadata differences and/or malicious identifiers that were previously received and/or identified during a previous iteration of determining malicious quantifier. The malicious training set may be received by one or more remote devices that at least correlate a metadata difference to a malicious identifier. The malicious training set may be received in the form of one or more user-entered correlations of a metadata difference to a malicious identifier.

Still referring to FIG. 1, computing device 104 may receive malicious machine-learning model from a remote device that utilizes one or more malicious machine learning processes, wherein a remote device is described above in detail. For example, and without limitation, a remote device may include a computing device, external device, processor, and the like thereof. Remote device may perform the malicious machine-learning process using the malicious training set to generate malicious quantifier 116 and transmit the output to computing device 104. Remote device may transmit a signal, bit, datum, or parameter to computing device 104 that at least relates to malicious quantifier 116. Additionally or alternatively, the remote device may provide an updated machine-learning model. For example, and without limitation, an updated machine-learning model may be comprised of a firmware update, a software update, a malicious machine-learning process correction, and the like thereof. As a non-limiting example a software update may incorporate a new metadata difference that relates to a modified metadata identifier. Additionally or alternatively, the updated machine learning model may be transmitted to the remote device, wherein the remote device may replace the malicious machine-learning model with the updated machine-learning model and determine the malicious quantifier as a function of the metadata difference using the updated machine-learning model. The updated machine-learning model may be transmitted by the remote device and received by computing device 104 as a software update, firmware update, or corrected malicious machine-learning model. For example, and without limitation malicious machine-learning model 128 may utilize a random forest machine-learning process, wherein the updated machine-learning model may incorporate a gradient boosting machine-learning process.

Still referring to FIG. 1, computing device 104 may determine malicious quantifier 116 as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support malicious machines, least squares support malicious machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least one value. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where a is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, computing device may determine malicious quantifier 116 as a function of identifying a string distance. As used in this disclosure a "string distance" is a quantitative measurement of space that exists between software component metadata to source repository metadata. In an embodiment, and without limitation, string distance may include a string metric, wherein a string metric is a metric that measures a distance between two text strings. In an embodiment, and without limitation, string metric may include a Levenshtein distance, wherein a Levinshtein distance is a distance between two input strings, wherein the distance is equivalent to the number of substitutions and/or deletions needed in order to transform a first input string to a second input string. In an embodiment, and without limitation, string metric may include one or more metrics denoting a difference as a function of phonetic, token, grammatical, and/or character based methods of statistical comparisons. In an embodiment, string distance may be unique to other distances as a closer distance may indicate a more likely malicious component name in software component metadata when compared to source repository metadata. For example, and without limitation, a distance of 0, an exact match, may carry the greatest contributing factor to the equation, wherein assuming the selected string comparison function returns a VALUE, and that VALUE is 0 for an exact match and some number N for "not similar", the NEWVALUE used in the equation may be achieved by subtracting the computed string distance from a positive maximum value, N. Computing device 104 may identify string distance as a function of a name matching algorithm. As used in this disclosure a "name matching algorithm" is a function and/or algorithm that is used to compute a distance between the software component metadata and/or source repository metadata. In an embodiment, and without limitation, name matching algorithm may be constructed manually using weights and algorithms or constructed via machine learning from examples (e.g., using examples of good packages and suspect packages). This may include classifiers (Bayes, Naïve Bayes, etc.), gradient descent algorithms, logistic regression, boosted gradient trees, neural networks or other known algorithms which can use these distance computations to adjust for a signaling event. As a non-limiting example, name matching algorithm may include one or more natural language processing modules, wherein a natural language processing module is described above. As a further non-limiting example, name matching algorithm may include one or more functions such as a Damerau-Levenshtein, q-gram, Cosine distance, Jaccar, and the like thereof. In an embodiment, and without limitation, name matching algorithm may remove and/or replace one or more non-alphanumeric characters such as but not limited to characters comprising "-, ( ), !, @, #, $, %, ^, &, *, [ ], { }, and the like thereof. Additionally, name matching algorithm may average different algorithms as well as dividing by total character count to compute a percentage can also improve matching. In an embodiment, and without limitation, name matching algorithm may reflect the actual likelihood of a "near match" and/or an exact match. In an embodiment, and without limitation, name matching algorithm may determine one or more string distances as a function of the plurality of metadata embedded within software component 108, such as software component metadata, and/or source repository 120, such as source repository metadata. In another embodiment name matching algorithm may determine a Levenshtein distance, Srensen—Dice coefficient, block distance, Hamming distance, Jaro-Winkler distance, simple matching coefficient, Jaccard similarity, Tversky index, overlap coefficient, variational distance, Hellinger distance, information radius, skew distance, confusion probability, Tau metric, Fellegi and Sunters metric, maximal match, grammar-based distance, TFIDF distance, and the like thereof.

In an embodiment, and still referring to FIG. 1, name matching algorithm may identify string distance as a function of a distance function for two values of the same parameter such as a metadata parameter. The distance algorithm for each parameter may be unique. The uniqueness of an algorithm may be determined by looking through metadata in a particular repository to find proper boundaries, ranges, and distributions of data. For example, and without limitation, distance algorithm may determine a distance between download counts for the name as typed package and/or library and the source repository. As a further non-limiting example, distance algorithm may determine a distance between contributor counts for the name as typed package and/or library and the source repository. distance algorithm may determine a distance between release counts for the name as typed package and/or library and the source repository. As a further non-limiting example, distance algorithm may determine a distance between release counts for the name as typed package and/or library and the source repository. As a further non-limiting example, distance algorithm may determine a distance between time first to last release for the name as typed package and/or library and the source repository. As a further non-limiting example, distance algorithm may determine a distance between release per period for the name as typed package and/or library and the source repository. As a further non-limiting example, distance algorithm may determine a distance between commits per period for the name as typed package and/or library and the source repository. As a further non-limiting example, distance algorithm may determine a distance between the number of lines for the name as typed package and/or library and the source repository. As a further non-limiting example, distance algorithm may determine a distance between package description for the name as typed package and/or library and the source repository. In an embodiment, and without limitation, distance algorithm may include one or more using machine learning modules as described above, this may include classifiers (Bayes, Naïve Bayes, etc), gradient descent algorithms, logistic regression, boosted gradient trees, neural networks or other known algorithms which can use these distance computations to adjust for a signaling event.

In an embodiment, and without limitation, computing device 104 may identify string distance as a function of the subtraction of the value of the metadata parameter for the name as typed from the value of the metadata parameter for the potential match, wherein if the potential match has a higher number of downloads than NAT, the distance will be a positive value and it not, a negative value. In another embodiment, a pre-processing step may be applied where the dataset of metadata values may be truncated to remove outliers and if certain potential matches have a value that exceeds the truncated limit, the value of the truncated limit applied. As a non-limiting example, the range of values for a particular metadata type may be large, wherein a logarithmic value may be used for the distance calculation in lieu of the actual parameter value and/or a bin number. In an embodiment, the string distance calculation may return a normalized value, wherein the difference is divided by some number to obtain a normalized value. For example, and without limitation, the difference may be divided by a number representing a range of values in the data set, the potential match metadata value, and/or the name as typed metadata value. In an embodiment, and without limitation, string distance may be used as a primary filter to limit the vast number of packages, and libraries to search to determine a likelihood that one or more of the potential matches appears to be more reputable and is the intended package or library because the similarity of the name as typed to the name of a potential match, which may be determined from a string distance.

In an embodiment, and still referring to FIG. 1, name matching algorithm produce a name vector as a function of software component metadata, source repository metadata, and/or additional data embedded in software component and/or source repository wherein a vector may be represented as an n-tuple of values, where n is one or more values, as described in further detail above; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. A two-dimensional subspace of a vector space may be defined by any two orthogonal vectors contained within the vector space. A vector's "norm' is a scalar value, denoted $\|\alpha\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

Still referring to FIG. 1, for the purposes of this disclosure a vector is "normalized' if it has been turned into a vector of length 1, or "unit vector" by scalar-multiplying the vector with the multiplicative inverse of its norm. In other words, a vector is normalized by the formula $$\frac{a}{\|a\|}.$$

In an embodiment, and with continued reference to FIG. 1, each unique extracted and/or other language element may be represented by a dimension of a vector space; as a non-limiting example, each element of a vector may include a number representing an enumeration of co-occurrences of the significant term and/or language element represented by the vector with another significant term, and/or language element. Alternatively or additionally, dimensions of vector space may not represent distinct terms, in which case elements of a vector representing a first term may have numerical values that together represent a geometrical relationship to a vector representing a second term, wherein the geometrical relationship represents and/or approximates a semantic relationship between the first term and the second term. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally or alternatively, degree of similarity may include any other geometric measure of distance between vectors.

Still referring to FIG. 1, name vectors in a vector space may represent a plurality of name relationships. As a non-limiting example, name relationships may include associations between the meanings of metadata comprising phrases, sentences, paragraphs, essays, novels, and/or any additional written text comprising one or more symbols, characters, letters, identifiers, and the like thereof. Additionally and/or alternatively name relationships may include, without limitation, synonymy, antonymy, homonymy, polysemy, and/or metonymy. As a non-limiting example, name vectors may be produced as a function of one or more strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data. Textual data may be parsed into tokens, which may include a simple word (sequence of letters separated by whitespace) or more generally a sequence of characters as described previously, as delineated by one or more separating characters such as spaces, punctuation or the like. The term "token," as used herein, refers to any smaller, individual groupings of text from a larger source of text; tokens may be broken up by word, pair of words, sentence, or other delimitation. These tokens may in turn be parsed in various ways. Textual data may be parsed using tokens into semantic units such as words or sequences of words as described above. Any or all possible sequences of tokens or words may be stored as "chains", for example for use as a Markov chain or Hidden Markov Model, to generate semantic units.

Still referring to FIG. 1, name matching algorithm may identify a string distance as a function of generating a matrix. As used in this disclosure "matrix" is a rectangular array or table of numbers, symbols, expressions, vectors, and/or representations arranged in rows and columns. For instance, and without limitation, matrix may include rows and/or columns comprised of vectors representing terms, where each row and/or column may be a vector representing an element of metadata; metadata represented by vectors in matrix may include all metadata as described above. Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{m \times n} = U_{m \times n} S_{m \times n} V_{n \times n}^T$$

Still referring to FIG. 1, singular value decomposition function may find eigenvalues and eigenvectors of $AA^T$ and $A^TA$. The eigenvectors of $A^TA$ may include the columns of $V^T$, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

In an embodiment, and still referring to FIG. 1, computing device may determine malicious quantifier 116 as a function of determining a similarity element. As used in this disclosure a "similarity element" is an element of data that represents a magnitude of similarity required for a malicious software to have a high likelihood of being embedded in software component 108. For example, and without limitation, similarity element may denote a value of 93 for a metadata element comprising a name of "ABC_", wherein the metadata element of the source repository is "ABc_". As a further non-limiting example, similarity element may denote a value of 20 for a metadata element comprising contributor count of 5000, wherein the contributor count of the source repository is 4900. In an embodiment, and without limitation, computing device 104 may determine similarity element as a function of performing a similarity test, wherein a similarity test may include any suitable norm such as cosine similarity, Euclidean distance measurement, and/or the like thereof. In an embodiment, and without limitation, similarity test may include any string distance measurement and/or similarity measurement as described above, such as but not limited to Levenshtein distance, Sørensen—Dice coefficient, block distance, Hamming distance, Jaro-Winkler distance, simple matching coefficient, Jaccard similarity, Tversky index, overlap coefficient, variational distance, Hellinger distance, information radius, skew distance, confusion probability, Tau metric, Fellegi and Sunters metric, maximal match, grammar-based distance, TFIDF distance, and the like thereof.

In an embodiment, and still referring to FIG. 1, determining malicious quantifier 116 may include generating a weighted vector. As used in this disclosure a "weighted vector" is a vector that has been modified and/or adjusted as a function of a unique weight for the combination of metadata elements. In an embodiment, and without limitation, weights may be unique for subsets of the open-source packages or libraries allowing for greater tuning of the method for indicating better possible package choices. In another embodiment, and without limitation, weights may be zero or any real number. In another embodiment, and without limitation, a weight value greater than 1 indicates that the metadata parameter is more important than other parameters. In another embodiment, and without limitation, weight values less than 1 indicate this metadata parameter is not as probative and is less likely to be major factor in contributing to the decision to present an alternate package or library to the user. In another embodiment, and without limitation, when scanning some open-source repositories (different component types) some weights may be intentionally set to 0 to avoid using the metadata, wherein this may occur when that type of metadata is not reliably available in that type of repository. In an embodiment, and without limitation, weighted vector may be generated as a function of a weighted multiplier. As used in this disclosure a "weighted multiplier" is a variable and/or function that modifies and/or adjusts malicious quantifier as a function of a relative string look-alike distance between the NAT package and/or library and the source repository stored and/or managed by a software repository that are potential matches. In an embodiment, and without limitation, weighted vector may be generated as a function of combining the relative distance for each parameter and weighting the combined relative distance.

In an embodiment, and still referring to FIG. 1, computing device 104 may generate malicious quantifier 116 as a function of obtaining a user input. As used in this disclosure a "user input" is a selection and/or signal by a user to proceed opening, running, and/or operating a library, package, and/or software component. For example, and without limitation, user input may denote that a user intends to still select the package and/or operate an executable. In an embodiment, and without limitation, computing device 104 may obtain user input and update one or more training sets described above to enhance the accuracy of malicious machine-machine learning model and/or name matching algorithm. Computing device 104 may generate malicious quantifier 116 as a function of the user input. For example, a first malicious quantifier representing a 92% likelihood that a malicious software is present may be modified as a function of obtaining a user input that no malicious software is embedded in software component 108, wherein a second malicious quantifier representing a 10% likelihood that a malicious software is present may be generated.

Still referring to FIG. 1, computing device 104 transmits a notification 132 as a function of malicious quantifier 116. As used in this disclosure a "notification" is a datum, signal, bit, and/or signal that at least conveys a message to a user relating to malicious quantifier 116. In an embodiment, and without limitation, notification 132 may include a wireless telecommunication and/or wireless communication signal. The wireless communication signals may include, without limitation, radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between fixed mobile devices over short distances using ultra high frequency radio waves between 2.402 GHz to 2.480 GHz. In an embodiment, and without limitation, notification 132 may include a wired telecommunication and/or wired communication signal. In another embodiment, and without limitation, notification 132 may include at least a communicable format for a user to understand. As used in this disclosure a "communicable format" is a manner and/or arrangement of data to communicate information to a user relating to malicious quantifier 116. For example, and without limitation, communicable format may include one or more emails, SMS messages, audio signals, visual signals, LED light indicators, vibrations, and the like thereof. In an embodiment, and without limitation, computing device 104 may transmit notification 132 as a function of a graphical user interface (GUI). For the purposes of this disclosure, a "graphical user interface" is a device configured to present data or information in a visual manner to a user, computer, camera or combination thereof. Notification unit may prompt a user to input a user input as a function of a required interaction and/or response. Notification unit may be configured to receive haptic, audio, visual, gesture, passkey, or other type of interaction from the user. Notification unit may perform one or more functions in response to the interaction from the user such as but not limited to weighting a malicious quantifier and/or generating a weighted vector.

Still referring to FIG. 1, computing device 104 transmits notification 132 as a function of malicious quantifier 116 and a predictive threshold 136. As used in this disclosure a "predictive threshold" is a limit and/or threshold that denotes high likelihood of a malicious software and/or malicious component is embedded in the software component. In an embodiment, and without limitation, predictive threshold 136 may denote that any malicious quantifier and/or value that is less than the threshold may indicate that software component 108 and./or NAT is not to be flagged as problematic for inclusion. In another embodiment, and without limitation, predictive threshold may denote that any malicious quantifier and/or value that exceeds and/or is greater than the threshold value may indicate a potential typo squatting, cybersquatting, or hijacking. In an embodiment, and without limitation, predictive threshold may denote a threshold for a string matching for a corporate match string to be investigated.

Still referring to FIG. 1, computing device may transmit notification 132 as a function of outputting a suggestive element. As used in this disclosure a "suggestive element" is an element of data denoting a suggestion and/or recommendation relating to software component 108. For example, and without limitation, suggestive element may denote that software component is recommended to not be included in a build and/or package. As a further non-limiting example, suggestive element may denote that software component 108 is recommended to be included in a build and/or package. In an embodiment, and without limitation, suggestive element may suggest that a package and/or library is authentic and/or not authentic. In another embodiment, and without limitation, suggestive element may denote that a package and/or library is not authentic, wherein suggestive element may suggest and/or recommend an authentic library and/or package. In an embodiment, and without limitation, computing device 104 may transmit suggestive element and receive user input such that user input may be stored in a historical repository. As used in this disclosure a "historical repository" is a database and/or databank comprising the packages and/or libraries that a user selects and/or chooses. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

In an embodiment, and still referring to FIG. 1, computing device 104 may be configured to generate an autonomous function, wherein an autonomous function is a mode and/or function of computing device 104 that automatically restricts and/or allows software component 108 to be incorporated and/or embedded in the build, package, and/or library. For example, and without limitation, autonomous function may incorporate one or more software components, libraries, packages, builds, executables, bins, and the like thereof into the build. In an embodiment, autonomous function may include one or more modes of autonomy such as, but not limited to, autonomous mode, semi-autonomous mode, and/or non-autonomous mode. As used in this disclosure "autonomous mode" is a mode that automatically allows and/or restricts software component 108 into the build. For example, autonomous mode may denote that computing device 104 will allow and/or restrict software component 108 into the build. As a further non-limiting example, autonomous mode may remove a first software component comprising a high likelihood of a malicious component embedded in the software component, wherein autonomous mode may replace first software component with a second software component that has a low likelihood of a malicious component embedded, and wherein the first software component and the second software component perform the same function. As used in this disclosure a "semi-autonomous mode" is a mode that automatically adjusts and/or controls or portion and/or section of software component 108. For example, and without limitation, semi-autonomous mode may denote that a user will regulate a first library and/or package, wherein computing device will regulate a second library and/or package. As used in this disclosure "non-autonomous mode" is a mode that denotes a user will regulate the software, build, library, and/or package in its entirety.

In an embodiment, and still referring to FIG. 1, computing device 104 may generate autonomous function as a function of an autonomous machine-learning model. As used in this disclosure an "autonomous machine-learning model" is a machine-learning model to produce an autonomous function output given malicious quantifier !! and user input as inputs; this is in contrast to a non-machine learning software program where the commands to be executed are determined in advance by a user and written in a programming language. In an embodiment, user input may include an implicit signal and/or an explicit signal. For example, and without limitation, user input may include an explicit signal, wherein the user explicitly overrides and/or adds software component 108 to the build. As a further non-limiting example, user input may include an implicit signal such as but not limited to ignoring and/or not responding to suggestive element and/or notification. In an embodiment, user input may be received as a function of a tri-state bus and/or multiplexor that denotes an explicit user input should be transmitted prior to any implicit user input.

Still referring to FIG. 1, autonomous machine-learning model may include one or more autonomous machine-learning processes such as supervised, unsupervised, or reinforcement machine-learning processes that computing device 104 and/or a remote device may or may not use in the generation of autonomous function, wherein a remote device is an external device to computing device 104 as described above. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support malicious machines, kernel support malicious machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 1, autonomous machine learning model may be trained as a function of autonomous training data, wherein autonomous training data may correlate a malicious quantifier and/or user input to an autonomous function. For example, and without limitation, a malicious quantifier of a high likelihood of malicious software embedded in software component due to a similar NAT and a user input proceeding to incorporate the software component into the build may result in an autonomous function that includes the NAT into a trusted and/or secured corporate repository function for future iterations. Autonomous training data may be received as a function of user-entered valuations of malicious quantifiers, user inputs, and/or autonomous functions. Computing device 104 may receive autonomous training data by receiving correlations of malicious quantifier and/or user input to an autonomous function that were previously received and/or determined during a previous iteration of generation of autonomous function. Autonomous training data may be received by one or more remote devices and/or FPGAs that at least correlate a malicious quantifier and/or user input to an autonomous function. Autonomous training data may be received in the form of one or more user-entered correlations of a malicious quantifier and/or user input to an autonomous function.

Still referring to FIG. 1, computing device 104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to computing device 104. Remote device and/or FPGA may transmit a signal, bit, datum, or parameter to computing device 104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new user input that relates to a modified malicious quantifier. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the malicious quantifier and/or user input using the updated machine-learning model. The updated machine-learning model may be transmitted by the remote device and/or FPGA and received by computing device 104 as a software update, firmware update, or corrected autonomous machine-learning model. For example, and without limitation autonomous machine learning model may utilize a neural net machine-learning process, wherein the updated machine-learning model may incorporate a gradient boosting machine-learning process Now referring to FIG. 2, an exemplary embodiment 200 of a string distance is illustrated. String distance includes any of the string distance as described above, in reference to FIG. 1. In an embodiment, and without limitation, string distance may include a distance calculation between a plurality of parameters. For example, string distance may be determined as a function of plotting a contributor count 204 on a y-axis and a download count 208 on the x-axis. As used in this disclosure a "contributor count" is a quantitative amount of the number of contributors that have access to a software component such as a package and/or library. In an embodiment, and without limitation, contributor count 204 may be determined as a function of possible matches being evaluated and/or by looking through the entire list of packages rather than just the filtered subset. IN another embodiment, and without limitation, the distribution of values may be relatively compact wherein the largest value may be only a few multiples of the smallest value and with few outliers. In another embodiment, and without limitation, a maximum value of 6 may be observed in the data set. In the illustrated embodiment, and without limitation, higher values may indicate a more active package and more likely to be a good choice, wherein the value 6 may be the optimal origin. As a non-limiting example, a higher number of contributors may be a general indication of a more utilized library which is less likely to be malicious. As used in this disclosure a "download count" is a quantitative value representing the number of downloads of a software component. In an embodiment, and without limitation, download count 208 may be computed by analyzing the metadata values for the entire list of possible matches being evaluated. In an embodiment, and without limitation, a higher number of downloads, may be a general indication of a more utilized library which may be less likely to be malicious. In an embodiment, and without limitation, an algorithm may be used to determine whether a log or linear scale would be preferred and if a log scale, the optimum base value, such that for a distance calculation, the corresponding log values may be used.

While the illustration uses two parameters for illustration purposes, the actual method is capable utilizing any number of dimensions. In an embodiment, and without limitation, string distance may be calculated as a function of a name matching algorithm, wherein name matching algorithm includes any of the name matching algorithm as described in FIG. 1. In another embodiment, and without limitation, name matching algorithm may include a distance algorithm, wherein the distance algorithm is extended to as many dimensions for which metadata parameters are available that may indicate a more suitable package than the one initially specified (the "name as typed") which is less likely to be malicious. In an embodiment, and without limitation, string distance may be determined as a function of combining the distance of two parameters to determine a combined distance for comparing two software components. In the illustrated example, two parameters may be used to compute a distance from a center origin that may indicate a better match for the user's intended included open source software than the name as typed. While the illustration utilizes cartesian coordinate system it is possible to use other coordinate systems in the distance computation.

Figure 2:
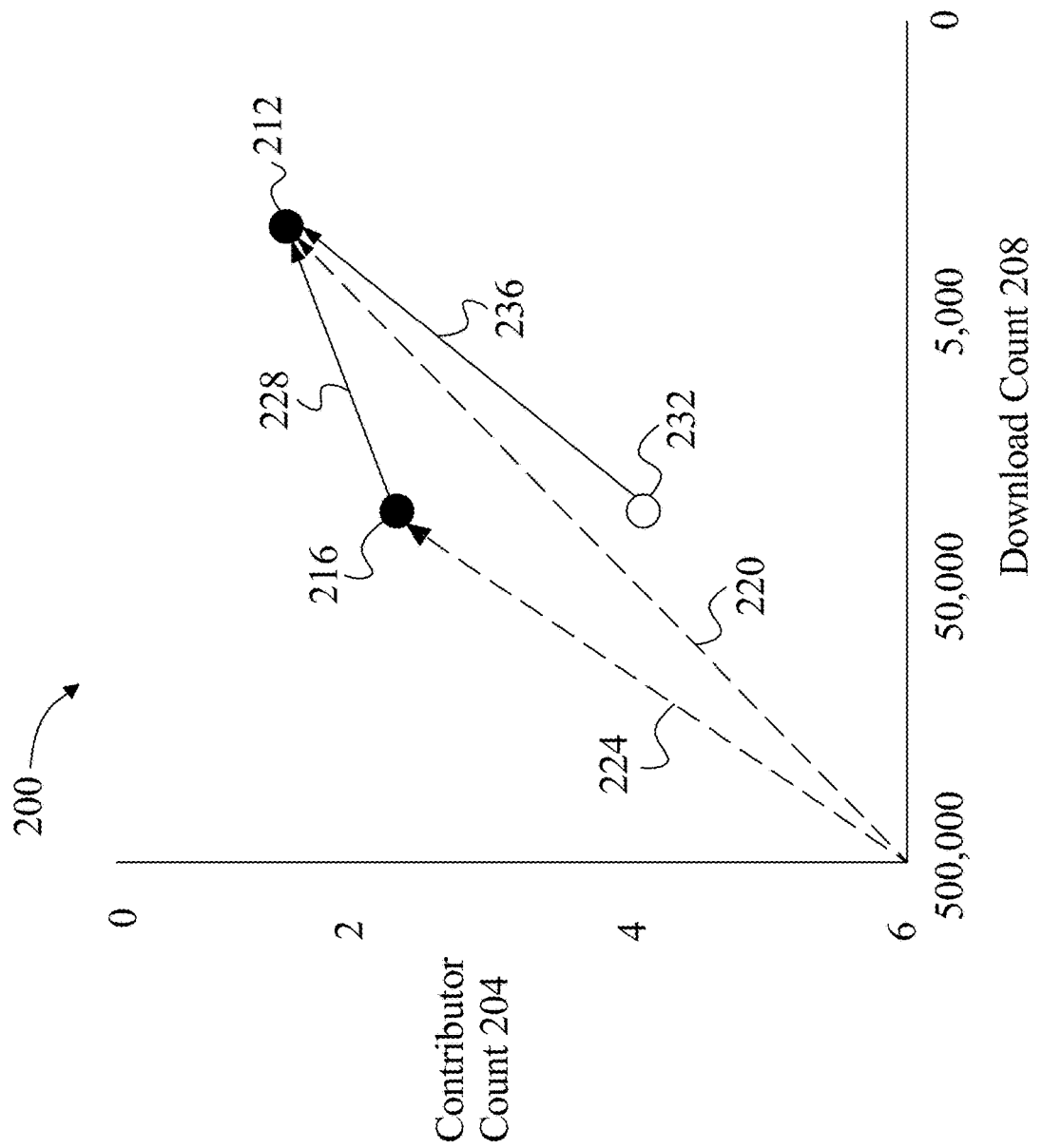
FIG. 2 is a diagrammatic representation of a string distance according to an embodiment of the invention.

Still referring to FIG. 2, a datapoint such as a name as typed open-source package 212 may be plotted on the graph. As used in this disclosure a "name as typed open-source package" is the unique identifier of one or more packages and/or libraries. For example, and without limitation, name as typed open-source package 212 may include prepend strings such as "ABC_", "MM_YY" and the like thereof. In an embodiment, and without limitation, name as typed open-source package 212 may include one or more letters, numbers, symbols, special characters, logos, and the like thereof. In another embodiment, and without limitation, name as typed open-source package 212 may include one or more languages such as but not limited to English, Japanese, Spanish, German, Russian, French, Mandarin, Arabic, Hindi, Portuguese, Bengali, Lahnda, and the like thereof. In an embodiment, and without limitation name as typed open-source package 212 may comprise a name as typed distance 220 from the origin of the graph. As used in this disclosure a "distance" is a quantitative measurement denoting a length and/or space between two things, points, lines, and the like thereof. For example, name as typed distance 220 may denote that a name as typed open-source package is 1.2 cm from the origin of the plot.

In another embodiment, and still referring to FIG. 2, a datapoint such as an alternate open-source package 216 may be plotted on the graph. As used in this disclosure an "alternate open-source package" is a unique identifier of one or more alternate and/or distinct packages and/or libraries from name as typed open-source package. For example, and without limitation, alternate open-source package 216 may include prepend strings such as "ABC_", "MM_YY" and the like thereof. In an embodiment, and without limitation, alternate open-source package 216 may include one or more letters, numbers, symbols, special characters, logos, and the like thereof. In another embodiment, and without limitation, alternate open-source package 216 may include one or more languages such as but not limited to English, Japanese, Spanish, German, Russian, French, Mandarin, Arabic, Hindi, Portuguese, Bengali, Lahnda, and the like thereof. In an embodiment, and without limitation alternate open-source package 216 may comprise an alternate distance 224 from the origin of the graph. For example, alternate distance 224 may denote that alternate open-source package 216 is 2.8 cm from the origin of the plot. In another embodiment, and without limitation, a difference distance 228 may represent an unweighted distance between name as typed open-source package 212 and alternate open-source package 216. For example, and without limitation, difference distance 228 may allow computing device to evaluate and/or determine one or more similarities between name as typed open-source package 212 and alternate open-source package 216.

In an embodiment, and still referring to FIG. 2, parameter values may be oriented to align maximum or "good" values at an origin point. For both of the illustrated parameters, contributor count and/or download count, a higher number indicates a higher likelihood the package is not malicious. Thus, the origin or intersection point of the two arrays of values for the two parameters are oriented such that both arrays decrease in value as they extend away from the origin. In an embodiment, and without limitation, the orienting step or the step of defining the array can be done across all software repositories and their corresponding open-source packages and libraries. In another embodiment, and without limitation, one or more repositories are grouped as subsets and analyzed separately, which can be more computationally efficient and improve the resolution of the calculations. In another embodiment, and without limitation, subsets can be aggregated in advance based on package and library metadata, such as by the programming language, the number of downloads or other metadata. In the illustrated example, for each metadata parameter, a reasonable scale and orientation for the axis is determined to compute the distance.

In another embodiment, and still referring to FIG. 2, datapoints may be weighted such that a weighted value 232 may be determined. As used in this disclosure a "weighted value" is a quantitative value that has been modified as a function of contribution element, wherein a contribution element denotes the relative amount of importance for a contributor count and/or a download count. For example, and without limitation, weighted value 232 may indicate a weighted value being applied to the distance between the Open-Source Package and the Name as Typed for the Contributor Count. As a further non-limiting example, weighted value 232 may be 3, wherein a value of 3 may indicate that the "number of contributors" should be given three times the weight when computing the distance, wherein the length of vertical component may be altered such that the computed distance may be 3 times as long. In an embodiment, and without limitation, if a weight were less than 1, it may indicate a smaller contribution to the distance. In another embodiment, and without limitation, a weight of 0 may indicate that this metadata parameter, for this subset of packages and/or libraries, may be ignored. Weights may be negative values, and behave similarly, when the axis orientation may indicate better values are further from point of origin. Additionally or alternatively, weights may be set for different open-source subsets. For example and without limitation, a language comprising a small number of contributors in most open-source packages may benefit from a little weight being given to the contributor count. Similarly, a language where the most popular libraries have large number of downloads may benefit by weighting the number of downloads higher. The weights may be determined with a separate analysis ahead of time or by an automated algorithm that compares known malicious libraries with their known targets. Additionally or alternatively, a weighted distance 236 may be determined as a function of weighted value 232. As used in this disclosure a "weighted distance" is a distance that extends from the weighted value to the name as typed open-source package value. In an embodiment, weighted distance 236 may be used to compare against predictive threshold to indicate whether the open-source package/library is potentially what the user wanted when compared with the "Name as Typed" package. In an embodiment, and without limitation, more credence may be given with a weight to the contributor count made the distance larger and more likely to go over the predictive threshold for presentation to the user.

In one example, the steps of aggregating subsets and orienting the arrays of parameter values to an origin for a composite distance calculation involves analyzing a data distribution for each metadata parameter and grouping and orienting similar data sets in a consistent fashion for evaluation. For example, if a data set has very large and very small samples, a logarithmic scale may be applied and a logarithmic value of the parameter used for the distance calculation. If a data set is linear with an even distribution, the actual numbers may be used. In yet other examples, a binning or bucketization may be used as described below in reference to FIG. 3. Orientation and scale allow the computed distance to have appropriate contributions from each parameter when indicating an open-source package is more likely to be what the user was looking for when compared to the "name as typed".

Figure 3:
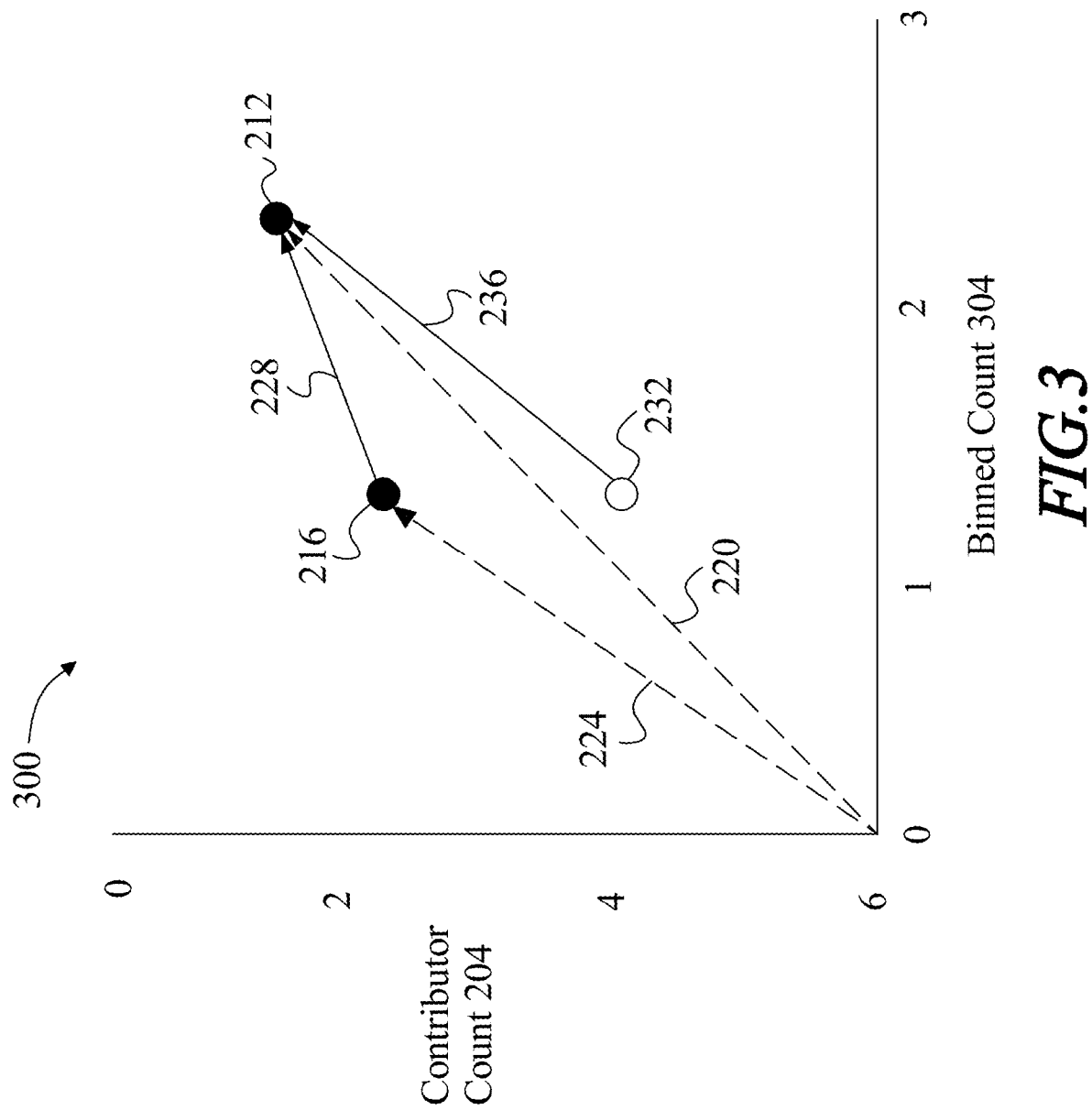
FIG. 3 is a diagrammatic representation of a bucketization according to an embodiment of the invention.

Now referring to FIG. 3, an exemplary embodiment 300 of a bucketization is illustrated. As used in this disclosure "bucketization" is a processing algorithm that groups and/or bins values together to distribute the numbers evenly on some statistical computational basis and/or on some other arbitrary scale. In an embodiment, and without limitation, bucketization may better indicate the actual value of the underlying values. In another embodiment, a higher number of downloads may be a general indication of a more utilized library which may be less likely to be malicious. While the illustration uses two parameters for illustration purposes, the actual method may be capable utilizing 1, 10, or more dimensions. The distance algorithm may be extended to as many dimensions for which metadata parameters are available that may indicate a more suitable package which is less likely to be malicious. In an embodiment, and without limitation, bucketization may be used to compute a distance from a center origin that may indicate a better match than the specified name as typed package or library. While the illustration utilizes cartesian coordinate system it may be possible to use other coordinate systems in the distance computation. In an embodiment, bucketization may comprise a binning protocol that may take the values of the axis and group them into ranges where numbers may be assigned an integer value. These values may be an even distribution of actual samples or may be some arbitrary range which is assigned to avoid outliers. For example, and without limitation, the actual number of bins or buckets may be arbitrary, but more bins may be used to indicate a finer distribution with more value to movement within those ranges. For example, and without limitation, download count 208 may be grouped and/or binned such that a binned count 304 may be computed. As used in this disclosure a "binned count" is a binned and/or bucketized download count and/or contributor count. For example, and without limitation, binned count 304 may assign a download count of 500,000 a value of 0, a download count of 500,000-50,000 a value of 1, a download count of 49,999-5,000 a value of 2, and a download count of less than 5,000 a value of 3. In an embodiment, and without limitation, the scale and/or breakdown of ranges for bucketization or binning may be computed by looking through the entire list of possible matches being evaluated or by looking through the entire list of packages. In another embodiment, and without limitation, bucketization and/or Binning may be used to remove outlier distributions of some metadata elements to avoid those outliers from overwhelming the computation or causing a loss of precision.

Figure 4:
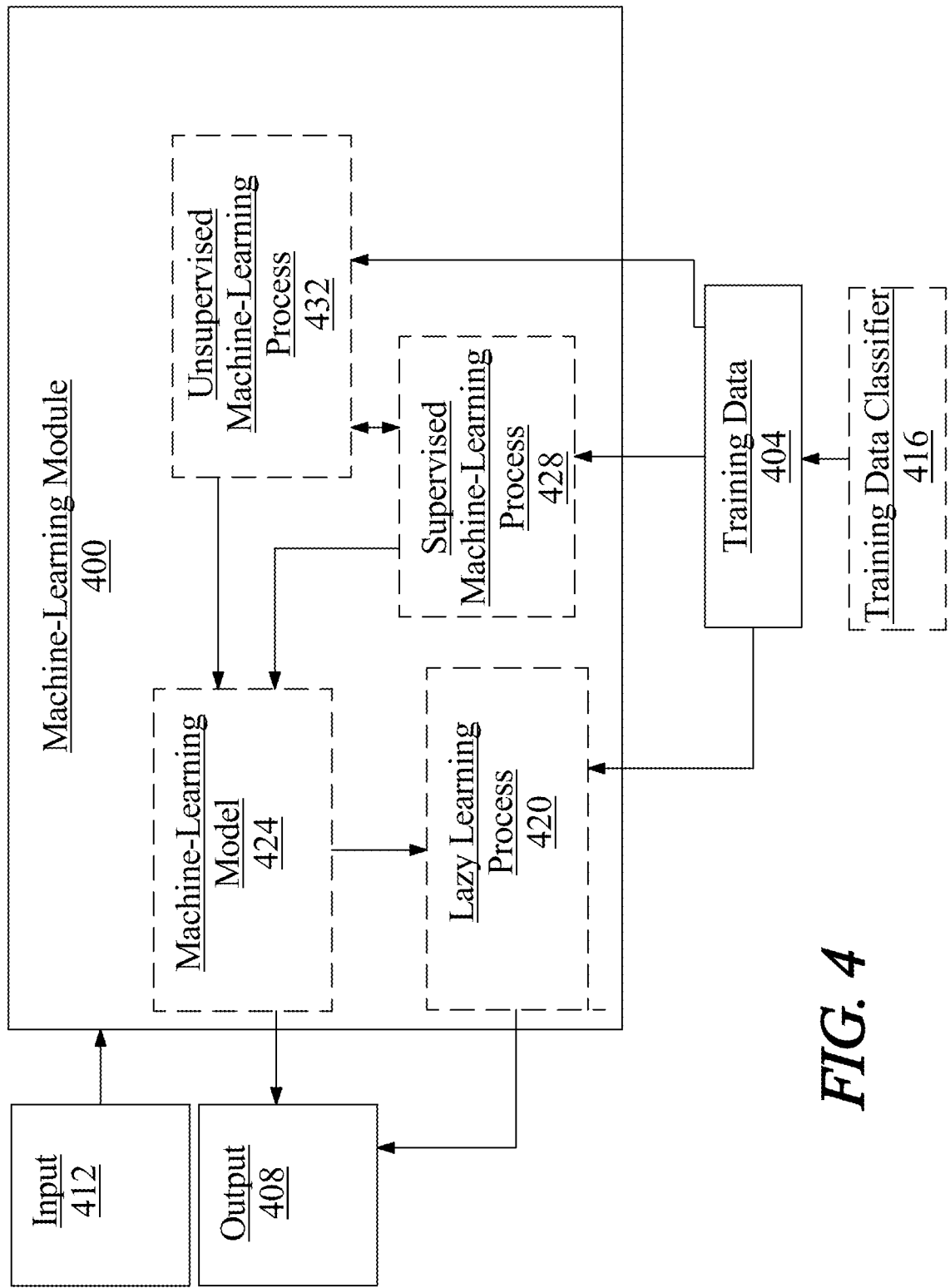
FIG. 4 is a block diagram illustrating an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs of software components and/or source repositories may result in an output of a malicious quantifier.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support malicious machines, least squares support malicious machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of software components such as libraries, packages, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include software components and/or source repositories as described above as inputs malicious quantifiers as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support malicious machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
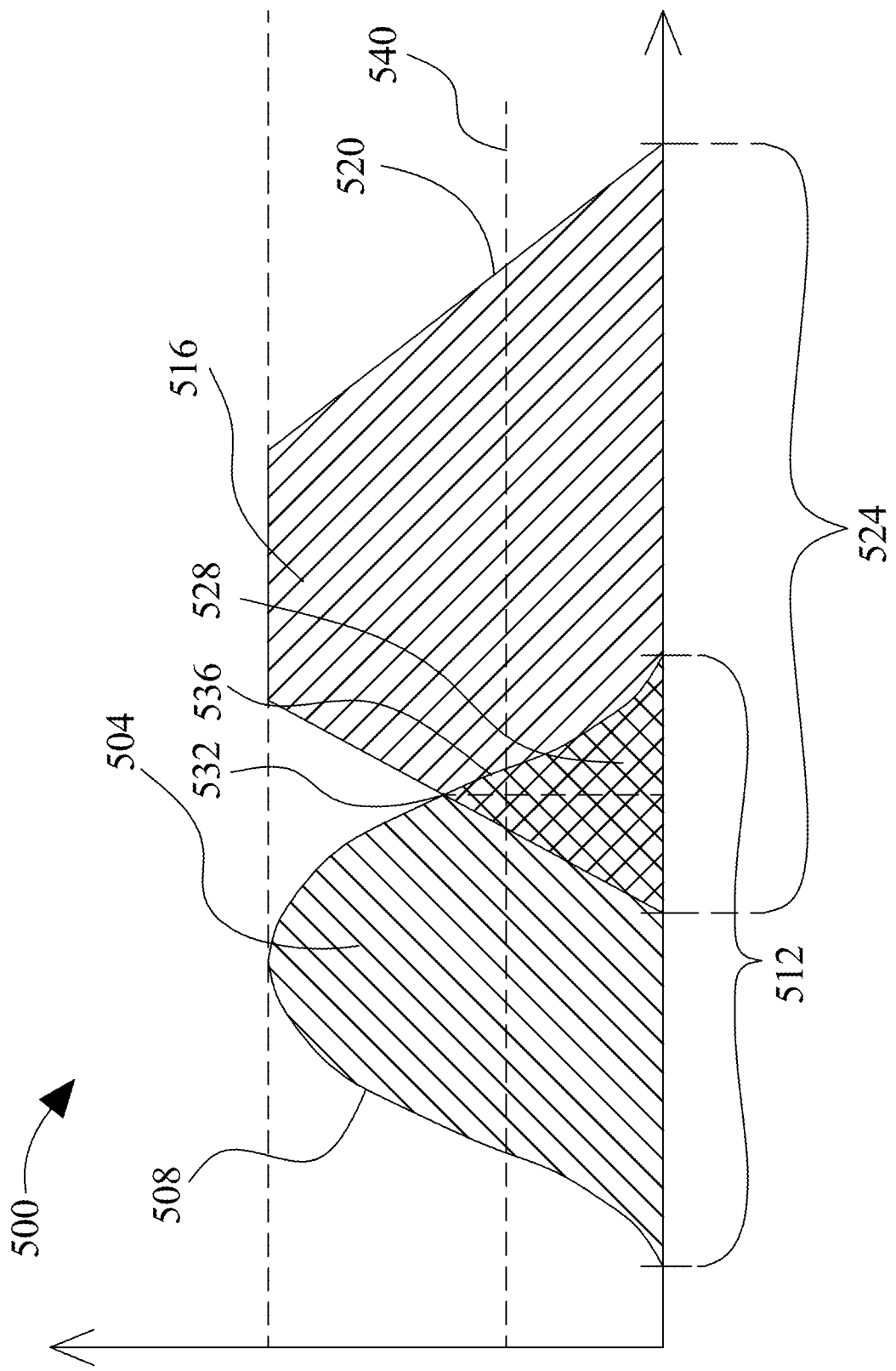
FIG. 5 is a block diagram illustrating exemplary embodiments of fuzzy sets.

Now referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 504 may represent any value or combination of values as described above, including any software component datum, any source repository datum, any malicious quantifier datum, any predictive threshold datum, any string distance datum, any resource datum, any niche datum, and/or any combination of the above. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 228 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, predictive threshold may indicate a sufficient degree of overlap between software component data, source repository data, string distances, and/or malicious quantifiers for combination to occur as described above. There may be multiple thresholds; for instance, a second threshold may indicate a sufficient match for purposes of predictive threshold as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two malicious quantifiers have fuzzy sets matching a malicious component fuzzy set by having a degree of overlap exceeding a predictive threshold, computing device 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 6:
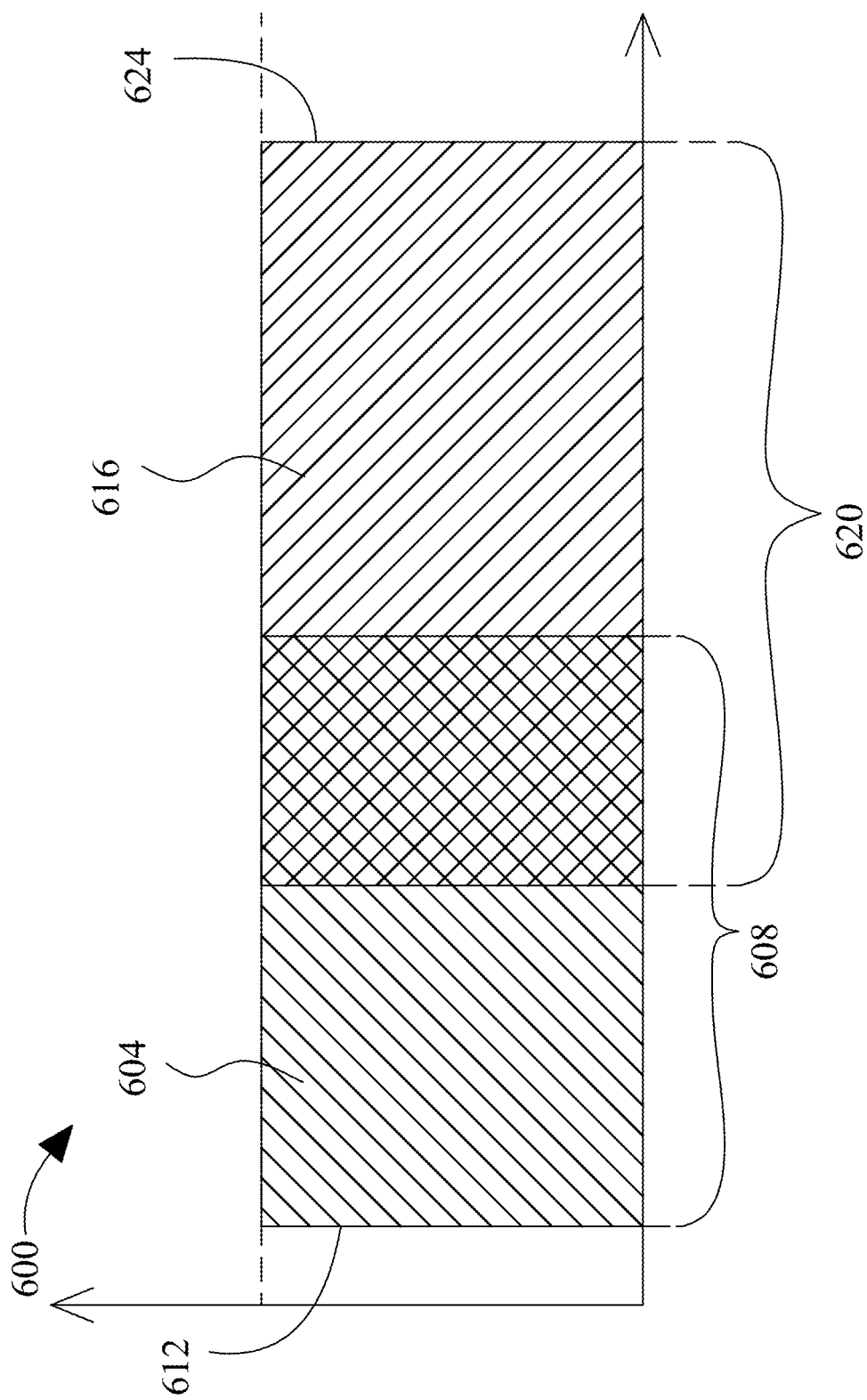
FIG. 6 is a block diagram illustrating exemplary embodiments of bivalent sets.

Referring now to FIG. 6, an exemplary embodiment of comparison of bivalent sets on ranges is illustrated. A first bivalent set 604 may be defined on a first range 608, which may have any form suitable for use as a first range 512 for a fuzzy set as described above. In an embodiment, first bivalent set 604 may be defined according to a first characteristic function 612, which may include, without limitation, a step function having output values on a probability interval such as [0,1] or the like; step function may have an output representing 100% or probability of 1 for values falling on first range 608 and zero or a representation of zero probability for values not on first range 608. A second bivalent set 616 may be defined on a second range 620, which may include any range suitable for use as first range 608. Second bivalent set may be defined by a second characteristic function 624, which may include any function suitable for use as first characteristic function 612. In an embodiment a match between first bivalent set 608 and second bivalent set 620 may be established where first range 608 intersects second range 620, and/or where first characteristic function 612 and second characteristic function 624 share at least one point in first range 308 and second range 616 at which both first characteristic function 612 and second characteristic function 624 are non-zero.

Figure 7:
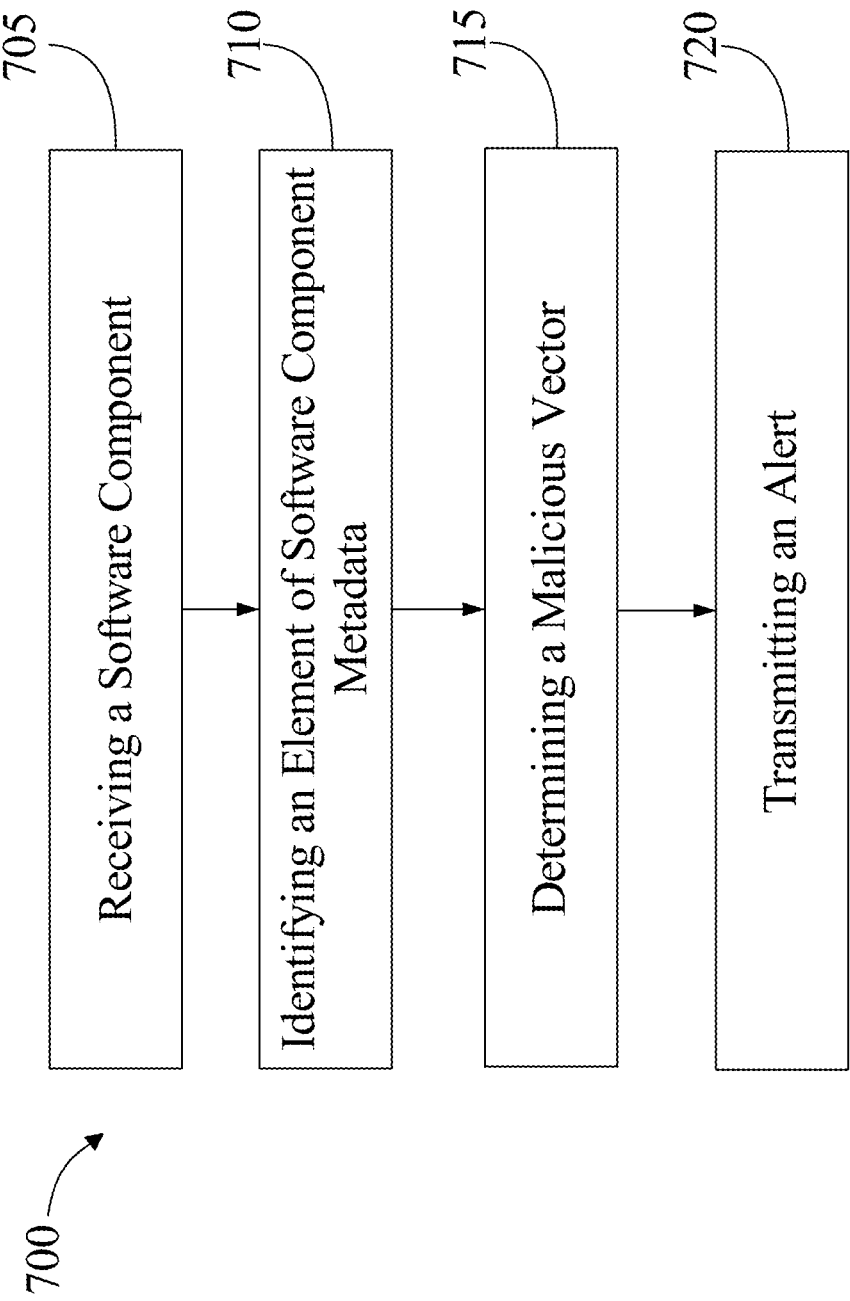
FIG. 7 is a flow diagram illustrating an exemplary embodiment of a method for automated malicious software detection.

Now referring to FIG. 7, an exemplary embodiment 700 of a method for automated malicious software detection is illustrated. At step 705, a computing device 104 receives a software component 108. Computing device 104 includes any of the computing device 104 as described above, in reference to FIGS. 1-6. Software component 108 includes any of the software component 108 as described above, in reference to FIGS. 1-6.

Still referring to FIG. 7, at step 710, computing device 104 identifies at least an element of software component metadata 112 corresponding to software component 108. Software component metadata 112 includes any of the software component metadata 112 as described above, in reference to FIGS. 1-6.

Still referring to FIG. 7, at step 715, computing device 104 determines a malicious quantifier 116 as a function of software component metadata 112. Malicious quantifier 116 includes any of the malicious quantifier 116 as described above, in reference to FIGS. 1-6. Computing device 104 determines malicious quantifier 116 as a function of obtaining a source repository 120. Source repository 120 includes any of the source repository 120 as described above, in reference to FIGS. 1-6. Source repository 120 includes at least an element of source metadata 124. Source metadata 124 includes any of the source metadata 124 as described above, in reference to FIGS. 1-6. Computing device 104 determines malicious quantifier 116 as a function of the at least an element of software component metadata 112 and the at least an element of source repository metadata 124 using a malicious machine-learning model 128. Malicious machine-learning model 128 includes any of the malicious machine-learning model 128 as described above, in reference to FIGS. 1-6.

Still referring to FIG. 7, at step 720, computing device 104 transmits a notification 132 as a function of malicious quantifier 116. Notification 132 includes any of the notification 132 as described above, in reference to FIGS. 1-6. Computing device 104 transmits notification 132 as a function of malicious quantifier 116 and a predictive threshold 136. Predictive threshold 136 includes any of the predictive threshold 136 as described above, in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
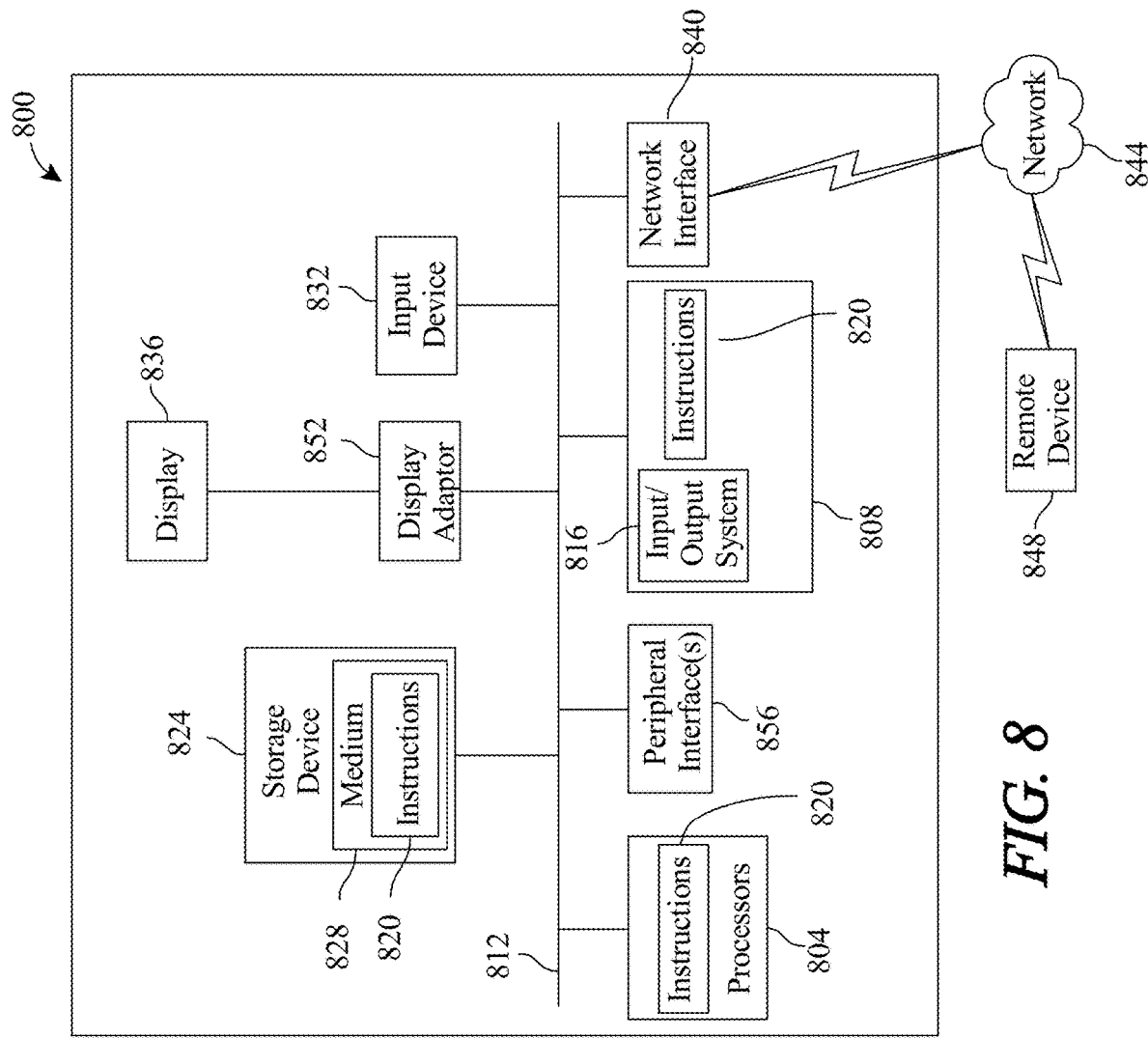
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for automated malicious software detection, the system comprising a computing device, the computing device comprising:
    a processor; and
    a memory communicatively connected to the processor, the memory containing instructions configuring the processor to:
        receive a software component, wherein the software component comprises at least an element of software metadata, wherein the at least an element of software metadata comprises a component name;
        obtain a source repository, wherein the source repository comprises at least an element of source metadata;
        identify a string distance between the at least an element of software metadata and the at least an element of source metadata, wherein identifying the string distance further comprises:

determining a download count of the software component;

determining a download count of the at least an element of source metadata; and determining the string distance as a function of a difference between the download count of the software component and the download count of the at least an element of source metadata;

generate a malicious machine-learning model as a function of a malicious training set, wherein the malicious training set correlates a metadata difference to a malicious identifier; and determine a malicious quantifier as a function of the malicious machine-learning model and the string distance.

2. The system of claim 1, wherein the malicious quantifier comprises a malicious vector.

3. The system of claim 1, wherein determining the malicious quantifier further comprises:

scanning a listing of software component names; and detecting a naming error as a function of a produced natural language processing module generated by the computing device.

4. The system of claim 3, wherein the natural language processing module comprises at least a program produced by the computing device, wherein the program is configured to:

extract at least a significant term from the software component; and produce a mathematical association as a function of the at least a significant term.

5. The system of claim 1, wherein determining the malicious quantifier further comprises:

updating the malicious machine-learning model as a function of a new string distance between the at least an element of software metadata and the at least an element of source metadata.

6. The system of claim 1, wherein the source repository comprises a database.

7. The system of claim 1, wherein the string distance comprises a string metric.

8. The system of claim 1, wherein identifying the string distance is a function of a name matching algorithm, wherein the name matching algorithm comprises a natural language processing model.

9. The system of claim 8, wherein the name matching algorithm is configured to:

produce a name vector as a function of the at least an element of software metadata and the at least an element of source metadata, wherein the name vector comprises a name relationship.

10. The system of claim 1, wherein determining the malicious quantifier further comprises:

performing a similarity test; and determining a similarity element as a function of the similarity test.

11. A method for automated malicious software detection, the method comprising:

receiving, by a computing device, a software component, wherein the software component comprises at least an element of software metadata, wherein the at least an element of software metadata comprises a component name;

obtaining, by the computing device a source repository, wherein the source repository comprises at least an element of source metadata;

identifying, by the computing device, a string distance between the at least an element of software metadata and the at least an element of source metadata, wherein identifying the string distance further comprises:

determining a download count of the software component;

determining a download count of the at least an element of source metadata; and determining the string distance as a function of a difference between the download count of the software component and the download count of the at least an element of source metadata;

generating, by the computing device, a malicious machine-learning model as a function of a malicious training set, wherein the training set correlates a metadata difference to a malicious identifier; and determining, by the computing device, a malicious quantifier as a function of the malicious machine-learning model and the string distance.

12. The method of claim 11, wherein the malicious quantifier comprises a malicious vector.

13. The method of claim 11, wherein determining the malicious quantifier further comprises:

scanning a listing of software component names; and detecting a naming error as a function of a produced natural language processing module generated by the computing device.

14. The method of claim 13, wherein the natural language processing module comprises at least a program produced by the computing device, wherein the program comprises:

extracting at least a significant term from the software component; and producing a mathematical association as a function of the at least a significant term.

15. The method of claim 11, wherein determining the malicious quantifier further comprises:

updating the malicious machine-learning model as a function of a new string distance between the at least an element of software metadata and the at least an element of source metadata.

16. The method of claim 11, wherein the source repository comprises a database.

17. The method of claim 11, wherein the string distance comprises a string metric.

18. The method of claim 11, wherein identifying the string distance is a function of a name matching algorithm, wherein the name matching algorithm comprises a natural language processing model.

19. The method of claim 18, wherein the name matching algorithm comprises:

producing a name vector as a function of the at least an element of software metadata and the at least an element of source metadata, wherein the name vector comprises a name relationship.

20. The method of claim 11, wherein determining the malicious quantifier further comprises:

performing a similarity test; and determining a similarity element as a function of the similarity test.

* * * * *